United States Patent [19]

Sloop

[11] 4,104,623
[45] Aug. 1, 1978

[54] FRAME FOR HOLDING A CAMERA

[76] Inventor: Conrad Beebe Sloop, 9092 Bermuda Dr., Huntington Beach, Calif. 92646

[21] Appl. No.: 629,531

[22] Filed: Nov. 6, 1975

[51] Int. Cl.² ............................................. G03B 17/56
[52] U.S. Cl. ...................................... 354/293; 354/82; 362/3
[58] Field of Search .................... 354/80, 81, 82, 293, 354/126; 240/1.3; 352/243; 362/3

[56] References Cited

U.S. PATENT DOCUMENTS

| 2,483,711 | 10/1949 | Roos | 354/293 |
|---|---|---|---|
| 2,614,471 | 10/1952 | Markowitz | 354/293 |
| 2,719,469 | 10/1955 | Sanford | 240/1.3 |
| 2,949,838 | 8/1960 | Skalabrin | 240/1.3 |
| 2,961,937 | 11/1960 | Karpf | 352/243 |
| 3,289,563 | 12/1966 | Kent | 354/293 |
| 3,333,093 | 7/1967 | Robinson | 240/1.3 |
| 3,434,406 | 3/1969 | Aune et al. | 354/293 |
| 3,550,519 | 12/1970 | Lewis | 240/1.3 |
| 3,893,144 | 7/1975 | Funderburk | 354/293 |
| 3,893,145 | 7/1975 | King | 240/1.3 |
| 3,913,116 | 10/1975 | Kastner | 354/223 |
| 4,016,583 | 4/1977 | Yeates | 354/293 |

Primary Examiner—L. T. Hix
Assistant Examiner—Alan Mathews
Attorney, Agent, or Firm—Lindenberg, Freilich, Hornbaker, Wasserman, Rosen & Fernandez

[57] ABSTRACT

Apparatus for holding a camera and flash unit so they are separated from one another, including a frame having an upper portion for holding the flash unit and a lower portion for holding the camera, and having a pair of laterally spaced handles near the lower portion. The handles are oriented so they can be held comfortably at slightly below eye level with the upper arms extending down and braced against the body and the forearms extending upwardly. One of the handles forms a palm pad lying under the camera so that the right hand can hold the pad in the palm while the thumb and middle or forefinger rest on the camera lens to turn it for focusing, or rest on the aperture ring for changing the lens opening. The other handle, which receives the left hand, is in the form of a bar which is angled from the vertical so it can be held without cramping the photographer's hand at the wrist.

1 Claim, 5 Drawing Figures

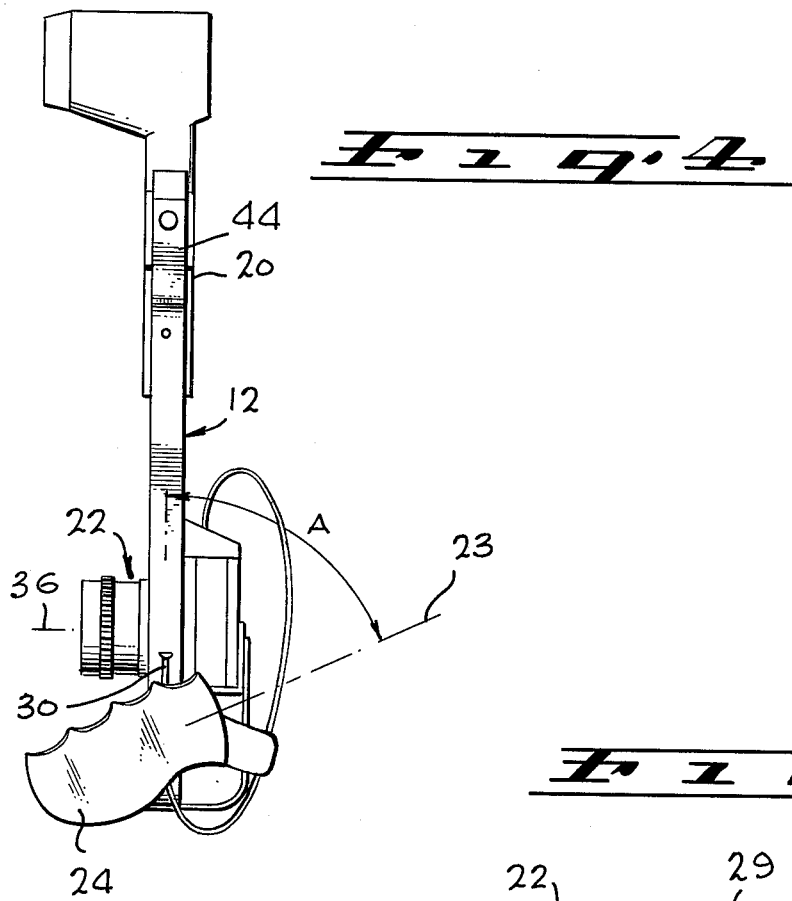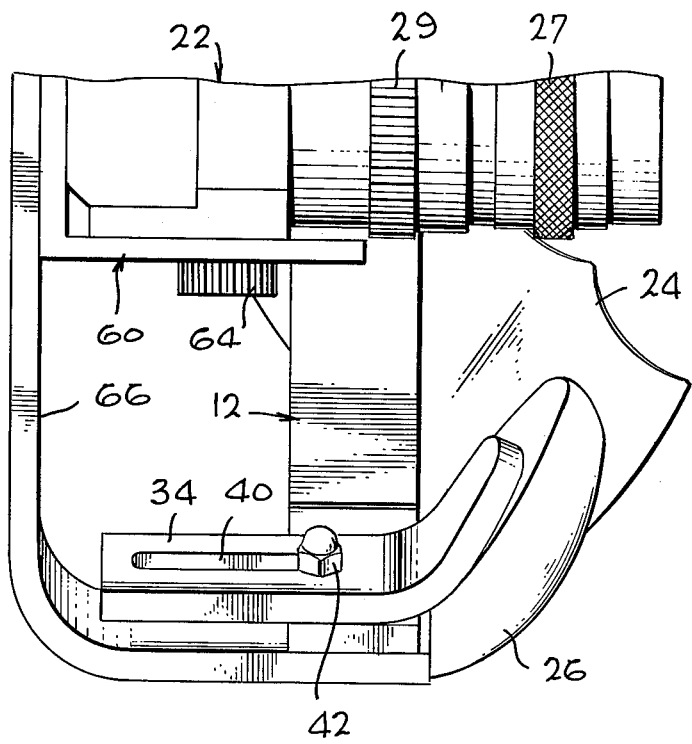

FRAME FOR HOLDING A CAMERA

BACKGROUND OF THE INVENTION

This invention relates to accessories for a camera, and more particularly to apparatus for holding a camera and flash unit.

Serious photographers usually hold a flash unit at a distance on the order of one foot or more away from the camera to avoid "pink eye" wherein reflections from the flash unit appear in the eyes of the subject. Usually, the flash unit is held high above the camera to eliminate disturbing side shadows. Devices for holding the camera and flash unit, with the flash unit high above the camera, are known. However, such devices have been uncomfortable and difficult to use.

In the taking of a typical flash photograph with a camera and flash unit holder, the substantial weight of the apparatus and the torque resulting from the center of gravity being at one side of the handle, must be supported for a period of several minutes while several pictures are taken. Where a common thirty-five millimeter camera is utilized, the apparatus must be held high enough that the camera lies at eye level while various adjustments are made, particularly the turning of the lens to focus it. The arm of the photographer can become tired in a short period of time, while holding the apparatus with the camera at eye level.

SUMMARY OF THE INVENTION

In accordance with one embodiment of the present invention, a camera and flash unit holder apparatus is provided which can be comfortably held for extended periods of time and which enables manipulation of the camera during such holding. The apparatus includes a frame with an upper portion for holding a flash unit substantially above the camera and a lower portion for holding a camera, and with a pair of laterally spaced handles at the lower frame portion. Both handles are oriented so they can be comfortably held at a level slightly below eye level, so that the camera can be located at eye level with the upper arms of the photographer extending down and braced against the body, and for steady shooting and with the forearms extending upwardly. One of the handles, for the left hand, is a bar which is angled from the vertical, so that it can be grasped by the hand without requiring unnatural and strained tilting of the wrist. The other handle, for the right hand, is in the form of a pad which can rest in the palm of the hand. The pad is located a few inches under the camera lens, so that when the pad rests in the palm of the right hand, the thumb and middle or forefinger of the hand can turn the lens on the camera to focus it and to change the lens opening.

The novel features of the invention are set forth with particularity in the appended claims. The invention will best be understood from the following description when read in conjunction with the accompanying drawings.

BRIEF DESCRIPTION OF THE DRAWINGS

FIG. 3 is a front elevation view of the apparatus of FIG. 1;

FIG. 4 is a left side elevation view of the apparatus of FIG. 1; and

FIG. 5 is a partial right side elevation view of the apparatus of FIG. 1.

DESCRIPTION OF THE PREFERRED EMBODIMENTS

Figure 2:
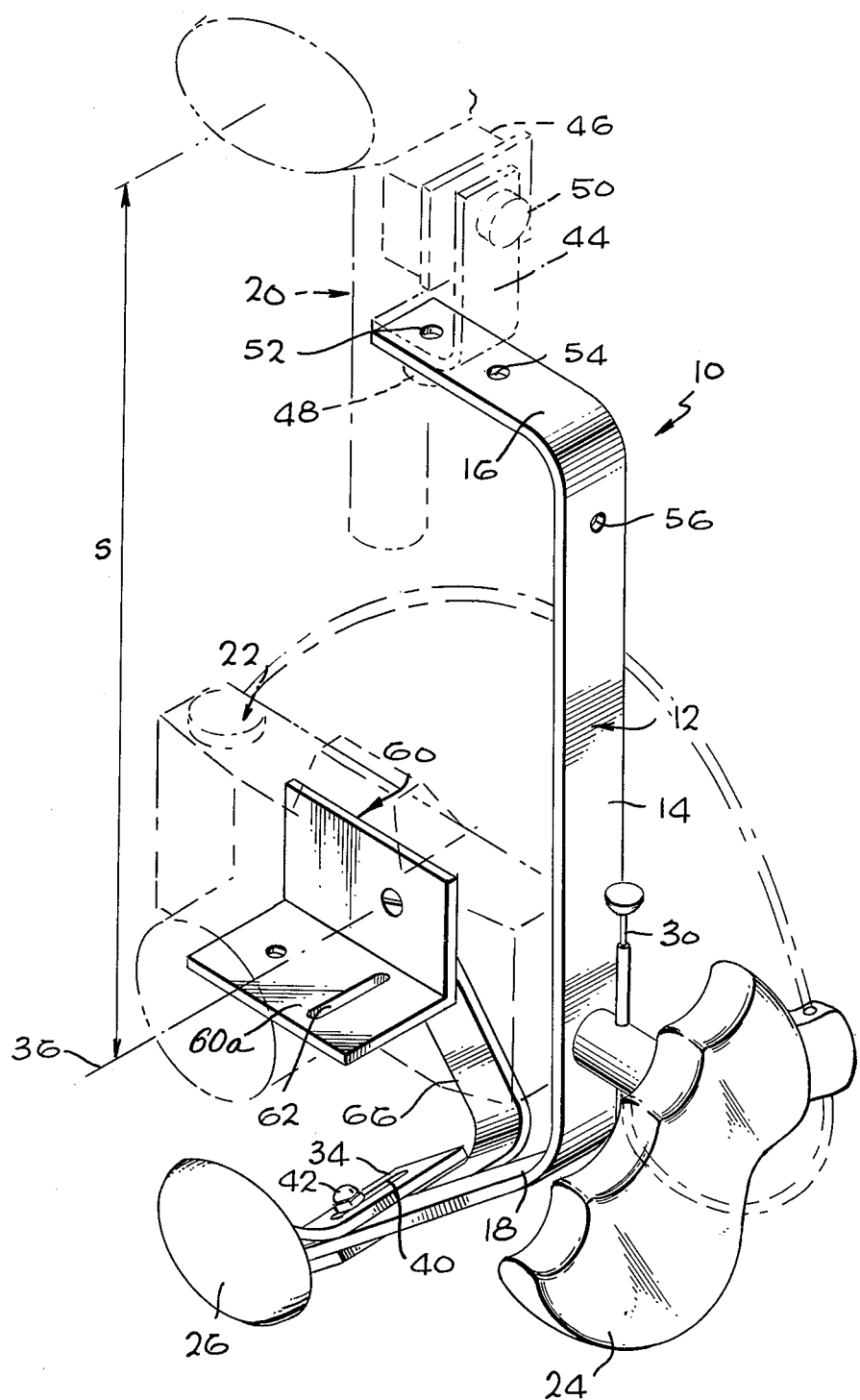
FIG. 2 is a front perspective view of the apparatus of FIG. 1.

The figures, particularly FIG. 2, illustrates the holder apparatus 10 of the invention, which includes an elongated bar 12 with an upstanding middle portion 14 and with upper and lower portions 16, 18 extending largely laterally and in the same direction from the middle portion. A flash unit 20 is mounted on the upper portion 16 of the holder while a camera 22 is mounted on the lower portion. The apparatus is constructed so that there is a considerable separation S, such as one foot, or more, between the flash unit and camera, with the flash unit located substantially above the camera. The apparatus is designed for use with a camera 22 of the type which is utilized by holding it at eye level, the thirty-five millimeter cameras being the most common type that are utilized with the holder apparatus of this invention.

A pair of handles 24, 26 are attached to the bar 12 of the apparatus to enable the secure holding of the apparatus with the camera at eye level. Each handle 24, 26 is designed for use in a different manner. The left handle 24 is designed for secure grasping of the apparatus, so that at times the entire apparatus can be held by the left hand of the photographer, with the left hand withstanding the weight of the apparatus as well as the torque resulting from the fact that the handle 24 lies to one side of the center of gravity of the apparatus. The other handle 26 is designed to support some of the weight of the apparatus, to eliminate the torque that would otherwise have to be withstood through the left handle 24, and to permit manipulation of the camera in preparation for taking a picture.

Figure 1:
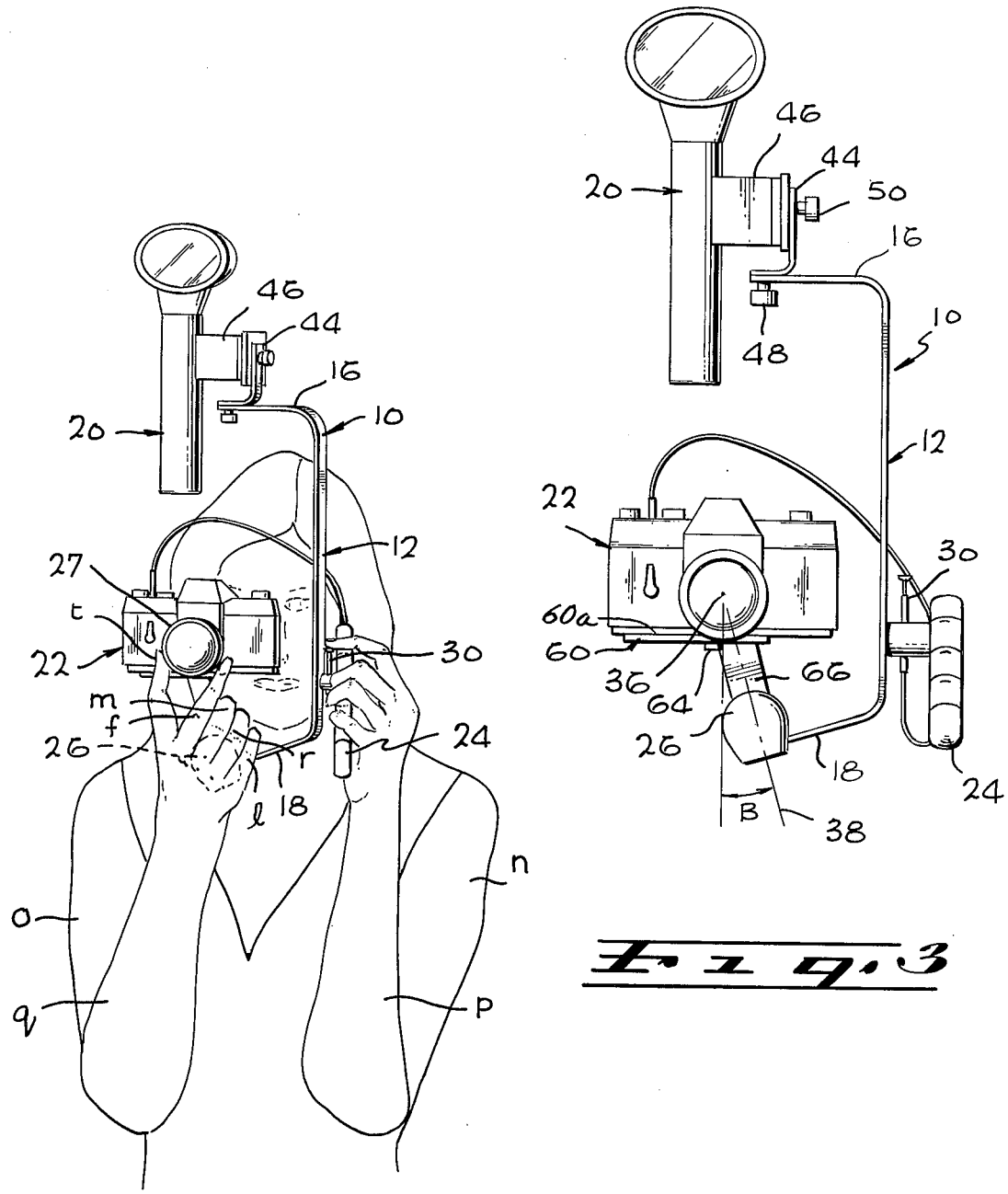
FIG. 1 is a front perspective view of the holder apparatus of the invention, showing it in use.

In a typical use of the apparatus, the photographer first firmly grasps the left handle 24 with his left hand while his right hand is used to make various preliminary adjustments, such as setting the shutter speed. He then lays the right handle 26 in the palm of his hand, as shown in FIG. 1, with his middle $m$, ring $r$, and little $l$, fingers lightly grasping the right handle 26. His thumb $t$ and forefinger $f$ extend upwardly to the barrel of the lens to grasp it for turning (the middle finger is sometimes used instead of the forefinger). The photographer looks through the view finder and turns a focusing ring 27 (FIG. 5) on the barrel of the lens with his right hand to focus the camera, and then depresses a cable release 30 with his left hand to trip the shutter. The photographer can also vary the lens opening by turning a separate aperture ring 29 on the lens barrel with his right hand.

Where a high quality picture is to be taken, it is typical for the photographer to hold the apparatus with the camera at eye level for a period of several minutes, ready to take a picture at any instant that a desired pose or the like, occurs. In order to minimize tiring of the arms, the handles are formed and oriented so that the apparatus can be held with the upper arms $n$, $o$ (which are the parts of the arms between the elbow and shoulder) extending downwardly and braced against the body, and with the forearms $p$, $q$ extending upwardly towards the handles. To this end, the left handle 24 is formed as a bar with the upwardly extending end of its axis 23 (FIG. 4) angled at a substantial rearward incline angle A, such as on the order of 60°, from the vertical. The handle 24 can be pivotally mounted on the bar to permit some adjustment of the angle. In prior devices, handles have been provided which extended substantially vertically. Such handles required the hand to be twisted forward at the wrist, which required that the upper arm extend considerably to the side of the body instead of being braced thereagainst. The bar-like handle 24 has a series of grooves for closely receiving the thumb and forefingers of the left hand without tilting the wrist, so that the photographer can tightly grasp the handles to hold the entire structure with his left hand, while his right hand performs preliminary setup of the camera and flash unit, all with his left upper arm braced against his body.

The right handle 26 is in the form of a heel or pad which can comfortably rest in the palm of the right hand. It is mounted on a pad bracket 34 about which the lower three fingers m, r, and l of the hand can extend to grasp the pad region. It may be noted that the pad handle 26 is not located directly under the optical axis 36 of the camera, but is instead located slightly to the left of a position under the optical axis, by locating it along an angle line 38 which extends at an angle B (FIG. 3) of approximately 15° from a vertical line that passes through the optical axis. By offsetting the palm pad to the left, the thumb and middle or forefinger of the right hand can more easily grasp the lens barrel while the palm pad lies in the hand. This is because when the right hand extends upwardly and slightly to the left, with the palm of the hand facing partially upwardly to receive the palm pad 26, the thumb is offset to the right from the palm and can more easily encircle a lens barrel at the right of the palm, this being achieved by offsetting the palm pad to the left of the lens barrel. The bottom of the pad 26 which rests on the heel of the hand, is about 4½ inches below the axis 36 of the lens, or about 3 inches below the horizontal camera-supporting surface of a support 60; in other words, the center of the pad which rests in the center of the palm, is about 2½ inches below the horizontal camera supporting surface 60a of support 60. The pad has a thickness of less than 1½ inch, to facilitate grasping by at least the middle and ring fingers of the hand.

The palm pad bracket 34 (FIG. 2) is formed with a slot 40 through which a fastener 42 extends which is fastened to the lower portion 18 of the frame. This permits the palm pad to be slideably adjustable at positions along an axis that extends parallel to the optical axis 36, to adjust for the different positions of focusing rings 27 on different lenses. For example, when a telephoto lens is utilized on the camera, the palm pad can be positioned forwardly so that the right hand can more easily turn the focusing ring of the telephoto lens. In the particular illustrated apparatus, the bracket 34 and slot 40 therein are made long enough for comfortable use with a typical telephoto lens of up to two-hundred millimeter, which is usually the maximum focal length which is utilized when taking pictures with a flash unit.

The flash unit 20 is held to the upper portion 16 of the frame by a pair of brackets 44, 46 (FIGS. 2 and 3). The pair of brackets are provided to enable turning of the flash unit to point in any direction. A first screw 48 which connects the upper frame portion 16 to the first bracket 44, permits turning of the bracket 44 about a vertical axis, and retightening at any angular position. Thus, for example, the flash unit can be turned to direct light at a sidewall to obtain sideward illumination of the subject. A second screw 50 which connects the top of the first bracket to the second bracket 46, can be loosened so that the flash unit can be turned about a horizontal axis and retightened at a new position. For example, the flash unit can be oriented to direct light upwardly for reflection by a ceiling or other overhead reflector downwardly towards the subject. It can be seen from FIG. 2, that the upper portion 16 of the frame and the bar 12 thereof, has two holes 52, 54, which permits the holding of a wide variety of flash unit-holding brackets or directs mounting of flash units. The most popular types of flash unit, however, are the types which have battery-holding handles, and thus similar to the unit 20 illustrated in the drawings. It may be noted that the bar frame has a hole 56 for holding a reflector mount over the flash unit, as is described in my copending patent application Ser. No. 629,532, filed Nov. 6, 1975.

The camera 22 is held on a right angle support 60 by a tripod screw 64 which extends through a slot 62 that is designed to fit many different models of 35 millimeter cameras. The support 60 is pivotally mounted on a member 66 that extends to the lower portion 18 of the bar. The camera support 60 can pivot about an axis approximately coincident with the optical axis 36 of the camera. A coupling between the support 60 and member 66 includes a spring washer 68 (FIG. 5) which is held compressed by a screw 70 and nut 72, to provide moderately high friction against pivoting of the camera. Thus, the camera can be pivoted to any position, and then holds its position. Such pivoting can be utilized, for example, to take vertical pictures, with the camera turned 90° from the orientation shown in FIG. 1 but with the flash unit 20 still located above the camera.

Thus, the invention provides holding apparatus for holding a camera and flash unit, which enables comfortable holding of the apparatus for extended periods of time while also allowing manipulation of the camera focusing ring and aperture ring on the lens barrel. This is accomplished by utilizing a pair of handles positioned so that they can be comfortably held with the camera at eye level and the upper arms of the photographer extending downwardly and braced against his body for steadiness in taking pictures and to minimize fatigue. One of the handles is in the form of a bar designed to be grasped by all of the fingers of the left hand for firm support of the camera during those times when the right hand cannot be used to hold the other handle, but with the left handle being engageable by the hand without uncomfortable twisting of the wrist. The right handle is in the form of a pad which can be held in the palm of the right hand, and is positioned so that during such holding, the thumb and forefinger of the hand can comfortably engage and turn the lens barrel of the camera.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. Camera holding apparatus designed to be held by a photographer and to hold the tripod socket of a camera with a rotatable lens barrel, comprising:
   a frame;
   a camera support having a tripod-engaging portion for engaging the tripod socket of a camera;
   said support being pivotally mounted on said frame about a predetermined axis of rotation, to permit a camera on said support to be turned 90° from the horizontal to the vertical;

a palm pad mounted on said frame so it lies under the lens barrel of a camera which is mounted on said camera support, said palm pad positioned so that a hand which receives the palm pad in its palm, can also reach up with fingers of that hand to turn the lens barrel of a camera on said support to focus the lens;

said camera support being pivotally mounted on said frame to turn 90° about a predetermined axis located about 1½ inches above said tripod engaging portion, so that after turning 90° from the horizontal to the vertical, the lens barrel does not substantially shift position.

* * * * *